United States Patent  [15] 3,671,773
Cardwell, Jr.  [45] June 20, 1972

[54] D.C. CONVERTER HAVING CONTROL TRANSISTOR IN BLOCKING OSCILLATOR FEEDBACK

[72] Inventor: Gilbert I. Cardwell, Jr., Peninsula, Calif.
[73] Assignee: The United States of America as represented by the Secretary of the Air Force
[22] Filed: May 18, 1971
[21] Appl. No.: 144,478

[52] U.S. Cl. ........................... 307/275, 331/112, 307/282
[51] Int. Cl. ................................................ H03k 3/30
[58] Field of Search ............ 307/275, 282; 331/112; 328/66

[56] References Cited

UNITED STATES PATENTS

| | | |
|---|---|---|
| 2,988,651 | 6/1961 | Richards ........................... 307/275 |
| 3,514,692 | 5/1970 | Lingle ............................... 307/282 |
| 3,582,826 | 6/1971 | Del Zotto ......................... 331/112 |

Primary Examiner—Donald D. Forrer
Assistant Examiner—Harold A. Dixon
Attorney—Harry A. Herbert, Jr. and William Stepanishen

[57] ABSTRACT

An apparatus for increasing an applied DC voltage level to a higher DC voltage level by utilizing a current feedback network to provide fast switching and control in the power transistors.

2 Claims, 1 Drawing Figure

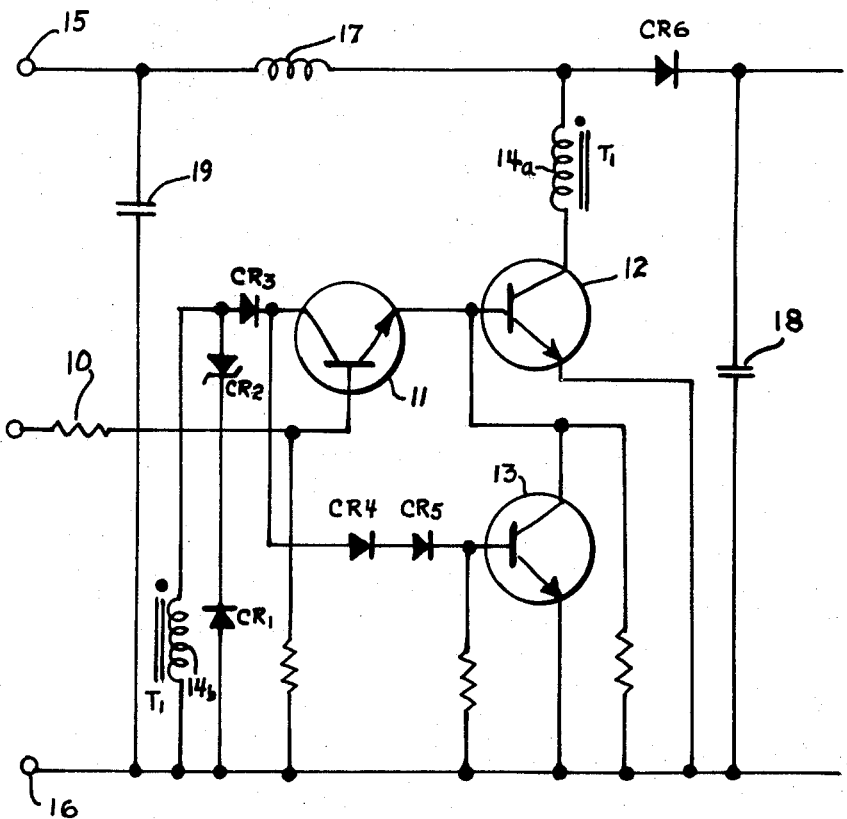

D.C. CONVERTER HAVING CONTROL TRANSISTOR IN BLOCKING OSCILLATOR FEEDBACK

BACKGROUND OF THE INVENTION

The present invention relates broadly to DC voltage level converters and in particular to a fast switching current feedback for utilization in power converter transistor applications.

It is well known in the DC power field that when working with DC power there exists requirements to convert one DC voltage level to a higher DC voltage level. In order to achieve this conversion of DC voltage from a lower level to a higher DC voltage level, various design problems are encountered. In the prior art, the conventional approach to achieve the required DC voltage level conversion was through the use of inverters, rectifiers and/or boost-add type converters. Generally, the boost-add type converters are the most efficient method to boost DC voltage. The current feedback approach is utilized in system which are required to be most efficient and to minimize drive losses. However, due to the positive feedback nature of the current feedback, these prior art systems are very often difficult to control and turn off, and to hold off without a resulting standby loss. When relatively low input voltages, such as 18 volts in, are utilized the efficiency of the system is substantially lower. Standby losses are incurred since a power source is required to hold off the current feedback circuit. The present invention provides a unique solution to the aforementioned problem areas and affords a current feedback power converter having fast switching, high efficiency and very low standby losses.

SUMMARY OF THE INVENTION

The present invention utilizes a current feedback technique to provide a DC voltage level converter. A control signal is provided to the base of a control transistor which controls the bias on the output transistor. The control signal causes the output transistor to turn on. A feedback element in the collector of the output transistor provides a positive current feedback drive to the control transistor which reinforces the drive that is applied to the output transistor. During the off or standby period, the output transistor cannot be turned on by noise or other perturbations on account of the feedback element in its collector. Since the control transistor is off, the current feedback drive, due to noise or other perturbations, is applied to a standby transistor which holds the output transistor in the off condition.

It is one object of the invention, therefore, to provide an improved DC voltage level converter apparatus utilizing current feedback to provide fast switching in the power transistors.

It is another object of the invention to provide an improved DC voltage level converter apparatus having high efficiency when operating at relatively low input voltages.

It is still another object of the invention to provide an improved DC voltage level converter apparatus having very low standby losses.

It is yet another object of the invention to provide an improved DC voltage level converter apparatus requiring no power source to hold off the current feedback circuit in the standby condition.

These and other advantages, features and objects of the invention will become more apparent from the following description taken in conjunction with the illustrative embodiment in the accompanying drawing where the FIGURE is a schematic diagram of the DC voltage level converter apparatus utilizing a current feedback circuit in accordance with this invention.

DESCRIPTION OF PREFERRED EMBODIMENT

Referring now to the FIGURE, there is shown a schematic diagram of a DC voltage level converter apparatus utilizing resistor 10 to receive the applied control signal. The resistor 10 which is connected to the base of control transistor 11, applies the control signal to the control transistor 11. The emitter of the control transistor 11 is connected to the base of the output transistor 12 which is biased in accordance with the control signal that is applied to the control transistor 11. Transistor 12 has the primary winding 14a of a current transformer as feedback element which is connected in its collector circuit to provide a positive feedback to control transistor 11. The secondary winding 14b of the current transformer is connected in the collector circuit of control transistor 11. A standby transistor 13 is utilized to maintain transistor 12 in the off condition during standby operation. When the system is in the standby condition, the control signal is removed from resistor 10 and transistor 12 is turned off. However, if during the standby condition, noise or other perturbations may attempt to turn on transistor 12, standby transistor 13 will hold transistor 12 in the off condition. Standby transistor 13 has its base connected to the collector circuit of control transistor 11 and has its collector connected to the base of control transistor 12. During standby, control transistor 11 is in the off condition, therefore any noise or other perturbation attempting to turn output transistor 12 on, is feedback by transformer $T_1$ to the base of standby transistor 13. Thus, standby transistor 13 is driven into the on condition and in turn drives output transistor 12 into the off condition.

The operation of the basic boost circuit will now be briefly described. For the purposes of this description the following is assumed: that terminal 15 is connected to a positive voltage supply source, terminal 16 is connected to a negative voltage supply source and output transistor 12 is in the on condition. Under these conditions, there will be a current rise in the inductor 17. When the output transistor 12 is turned off, the current will flow through diode, CR6, transferring the energy which is stored in inductor 17 to capacitor 18. The voltage on capacitor 18 is thereby boosted above the input voltage of capacitor 19. By controlling the ON to OFF ratio of output transistor 12, the output voltage can be controlled.

The switching and current feedback techniques used in the circuit are of primary importance. It should be noted that these techniques lend themselves to many types of power transistor switching applications including such things as inverters, converters and choppers, as well as the boost-add converter described above. These switching techniques will be described with the following assumption that a control voltage is applied to the input of resistor 10. The base emitter junction of control transistor 11 is biased on as is the base emitter of transistor 12. The output transistor 12 is thereby turned on. As collector current rises in output transistor 12, the current is coupled, through the current transformer T1, to the collector of control transistor 12. When control transistor 11 is driven on, this current is then fed into the base of output transistor 12, thereby providing current feedback. This positive feedback provides reinforced drive to output transistor 12, causing it to turn on very rapidly. The feedback ratio of T1 is chosen to provide optimum drive to output transistor 11. This drive is a constant ratio of the collector current, thereby not wasting high drive currents at low load conditions. When the control voltage is removed from resistor 10, control transistor 11 turns off. When control transistor 11 turns off, the current coming from transformer T1 is redirected through, bias diodes CR4 and CR5, to standby transistor 13. Standby transistor 13 turns on and provides a very low impedance path between the base and emitter of output transistor 12. This low impedance path removes stored charge from the base junction of output transistor 12, causing output transistor 12 to switch off rapidly. After output transistor 12 turns off, transformer T1 is reset to its residual flux level, Br, quickly due to the diodes CR1 and CR2, thus preparing the circuit for another cycle. During the off period, if noise or other perturbations attempt to turn on output transistor 12, the current feedback from its collector drives standby transistor 13 on and prevents output transistor 12 from turning on. Therefore, it is not necessary to apply standby power to this circuit (as one must to other current feedback circuits) in order to prevent extraneous turn on or a run-away condition.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. A DC voltage level converter apparatus utilizing current feedback network to provide fast switching and control comprising in combination:

a control transistor having a base, emitter and collector, said base having an input resistor connected thereto, said input resistor receiving a control signal, an output transistor having a base, emitter and collector, said base of said output transistor being connected to said emitter of said control transistor, said output transistor being responsive to said control signal which is applied to said control transistor, a negative voltage supply terminal to receive a negative voltage, said base of said control transistor being connected to said negative voltage supply terminal by a base resistor, said emitter of said output transistor being directly connected to said negative voltage supply terminal, a current feedback transformer having a primary and a secondary winding, said primary winding having one end connected to said collector of said output transistor, said secondary winding having one end connected to said collector of said control transistor, the other end of said secondary winding being connected to said negative voltage supply terminal; and, a positive voltage supply terminal to receive a positive voltage, said positive voltage supply terminal having an inductor connected thereto, the other end of said inductor being connected to the other end of said primary winding of said current feedback transformer, a first capacitor connected between said positive voltage supply terminal and said negative voltage supply terminal, a diode having an anode and a cathode, said anode being connected to said junction of said inductor and said secondary winding, said cathode providing an output terminal, a second capacitor being connected between said cathode and said negative voltage supply terminal.

2. A DC voltage level converter apparatus as described in claim 1 further including a feedback transistor having a base, emitter and collector, said emitter being connected to said negative voltage supply terminal, said collector being connected to said base of said output transistor, said base being connected to said collector of said control transistor to maintain said output transistor in the off condition during standby operation, said control signal being removed from said input resistor during standby operation.

* * * * *